United States Patent [19]

Prewett

[11] 4,154,305

[45] May 15, 1979

[54] AERATOR APPARATUS

[76] Inventor: Jesse L. Prewett, 1148 N. Kennevec St., McConnellsville, Ohio 43756

[21] Appl. No.: 855,814

[22] Filed: Nov. 30, 1977

[51] Int. Cl.[2] .............................................. A01B 45/02
[52] U.S. Cl. ........................................ 172/21; 172/42; 172/97; 172/116; 172/125
[58] Field of Search ....................... 172/21, 22, 35, 38, 172/42, 43, 48, 57–59, 75, 77, 91, 92, 95–97, 107, 108, 110, 111, 116, 117, 125; 173/52; 175/108

[56] References Cited

U.S. PATENT DOCUMENTS 2,067,781  1/1937  Mueller .................................. 172/22

FOREIGN PATENT DOCUMENTS 225403  4/1958  Australia ................................... 172/21
475085  4/1929  Fed. Rep. of Germany ............ 172/21

Primary Examiner—Richard C. Pinkham
Assistant Examiner—R. Carl Moy
Attorney, Agent, or Firm—Francis T. Kremblas, Jr.

[57] ABSTRACT

An apparatus for aerating lawns or the like which features a novel construction wherein the tines include a rotating drilling action with a forward and downward motion to effectively aerate the turf as well as impart a forward walking type action to the apparatus as a whole. Further, the individual tines include a pressure limiting construction to prevent damage to the tines in addition to eliminating damage to sidewalks or other hard surfaces which may inadvertently be contacted during use.

2 Claims, 6 Drawing Figures

FIG. 2-A.

AERATOR APPARATUS

BACKGROUND

Many types of prior art machines are presently available which function to make holes or openings in turf for the purpose of providing aeration in order to promote healthier growth of the grass. Most of these apparatus are designed primarily for commercial use, such as on golf courses, although some models which are designed for attachment to a lawn tractor are available ostensibly for residential use. Most of these machines provide tines which are mounted on a cylindrical roller although at least one commercial type provides hydraulically actuated tines which are vertically reciprocated to penetrate the turf.

However, there is no apparatus on the market which provides a self-contained unit having a construction which lends itself to a more modest cost for use on medium to large sized residential lawns.

The known prior art aerators presently available are of such a size and construction which require self-propulsion which adds significantly to the cost. Other smaller models are relatively heavy and are designed to be pulled by a small tractor or the like.

Further, most of the prior models possess no feature to prevent damage to the tines if a hard object such as a rock or stone is contacted during use or to prevent damage to a concrete or other hard surface which may accidently be contacted by the user during operation.

SUMMARY OF THE INVENTION

The present invention relates generally to turf aerating apparatus and particularly to an aerating apparatus of novel construction which permits relatively low cost manufacture compared to prior apparatus.

The apparatus of the present invention is characterized by a plurality of tines which are uniquely rotatably mounted to provide a drilling action as well as being fixedly mounted to a platform having parallel crank linkage to impart a forward and downward motion during operation tending to provide a walking action.

The apparatus is designed for movement by manual effort when not in operation however, the tines are uniquely connected to a power source which provides both the rotary drilling action as well as the forward and downward walking action during use which tends to substantially reduce the manual effort required during active operation.

Additionally, each tine is provided with an independent pressure limiting feature to inhibit damage upon striking a hard surface such as an imbedded rock or stone.

OBJECTS

It is a primary object of the present invention to provide a self-contained aerator apparatus which employs a unique construction and operating principle which permits relatively low cost manufacture and yet very efficient operation for residential type use.

It is another object of the present invention to provide an apparatus of the type described wherein readily available components may be used to economically manufacture and assemble the apparatus.

It is another object of the present invention to provide an apparatus of the type described wherein the tines for imparting the aerating holes are designed with a drilling action to reduce both the power required as well as the weight of the apparatus as compared to prior art machines.

It is still another object of the present invention to provide an apparatus of the type described wherein the tines are mounted on a platform having a parallel linkage which provides a downward thrust to the tines as well as a forward thrust to the apparatus during operation which reduces the manual effort required for operation.

It is a further object of the present invention to provide an apparatus of the type described which includes an independent pressure relief construction for each tine to prevent inadvertent damage upon striking a hard surface or object.

It is yet another object of the present invention to provide an apparatus of the type described which includes all of the above mentioned features in a construction which efficiently provides the aeration function in a relatively compact and low cost machine.

IN THE DRAWINGS

FIG. 2A is an enlarged view of a guide tube and slot;

DETAILED DESCRIPTION

Figure 1:
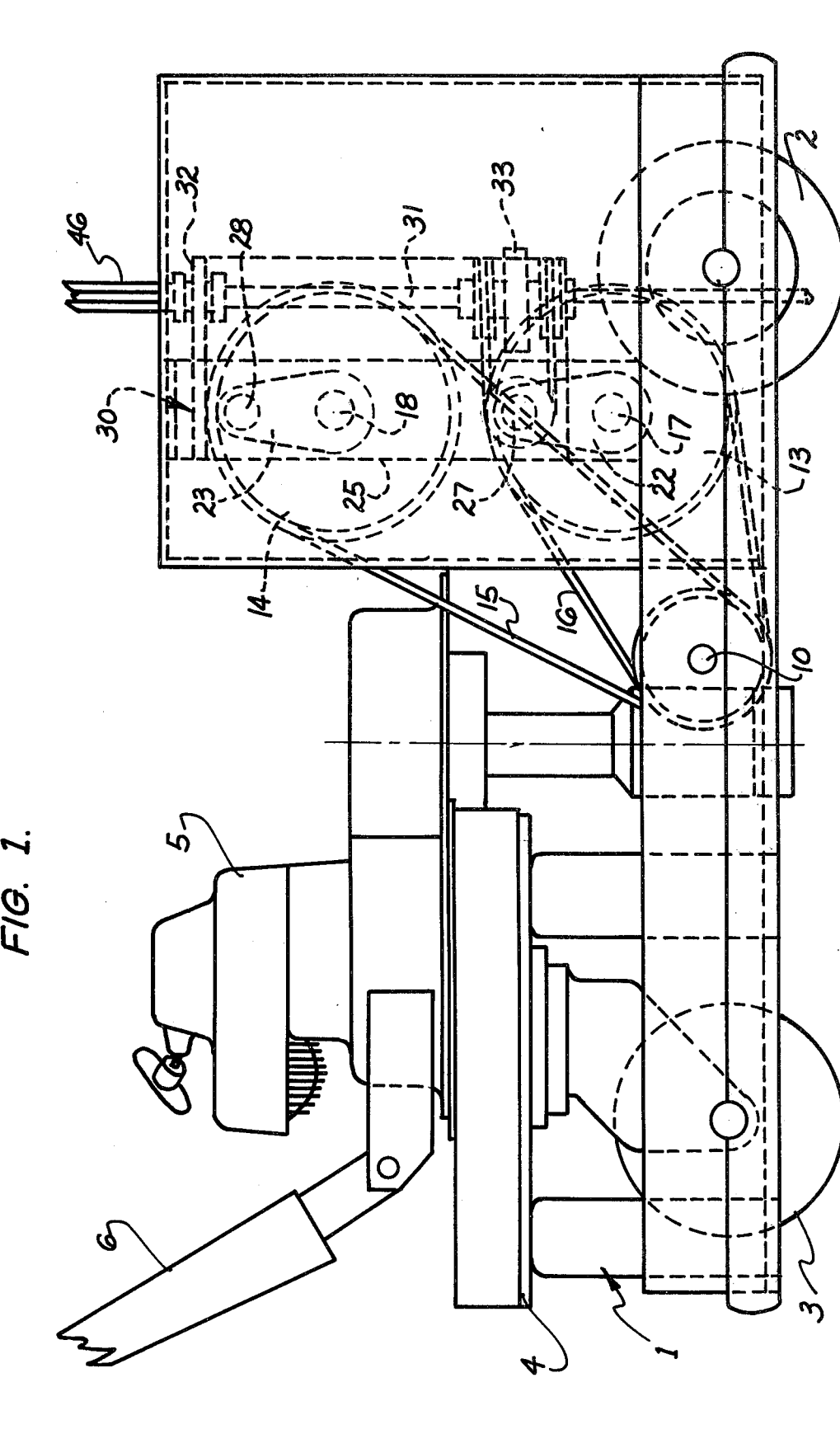
FIG. 1 is a side elevational view of an aerator apparatus constructed in accordance with the present invention.

An aerating apparatus constructed in accordance with the present invention is illustrated in FIG. 1 and includes a base or frame, indicated generally at 1, which is provided with conventional front wheels 2 and castor wheels 3 on the rear portion.

The rear portion of frame 1 includes a mounting plate 4 upon which a conventional gasoline engine 5 and a handle 6 are conventionally mounted by means of bolts or the like. Such a handle and engine assembly is typical of lawn mowers or rotary tillers for example, and similar types may be employed to economic advantage with the present invention.

A drive shaft 10 is operatively connected to engine 5 via a gear reduction assembly 8 and is provided with a pair of sprockets 11 and 12 fixed on each end thereof. Sprockets 11 and 12 are operatively connected to a respective pair of sprockets 13 and 14 by suitable chains 15 and 16.

Figure 5:
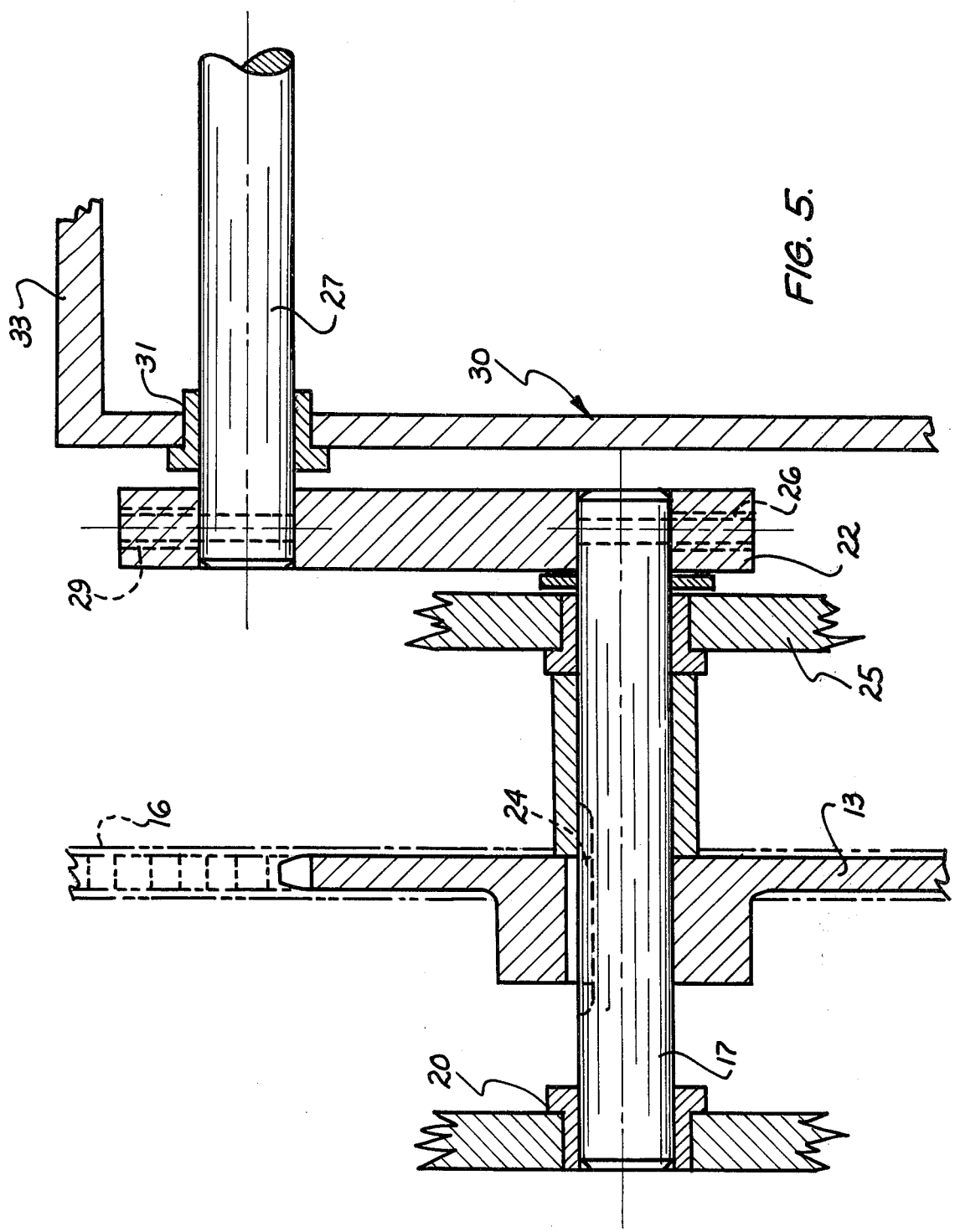
FIG. 5 is a side elevational view of a portion of the apparatus shown in FIG. 1 in section, illustrating the parallel crank arm and associated shaft means which form a portion of the present invention.

Sprockets 13 and 14 are mounted on respective shafts 17 and 18 and keyed to each shaft such as at 24, in FIG. 5. In turn, each shaft is journaled to a vertical frame member 25 forming a portion of main frame 1, such as at 20 and 21 and connected to a respective one of cam style arms or bell cranks 22 and 23 as best seen in FIG. 5.

Figure 2:
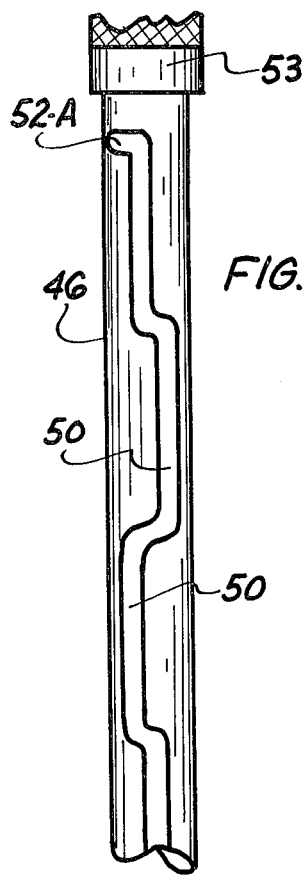
FIG. 2 is a side sectional view of the forward portion of the apparatus shown in FIG. 1, the section being taken through the centerline of the apparatus.
Figure 2:
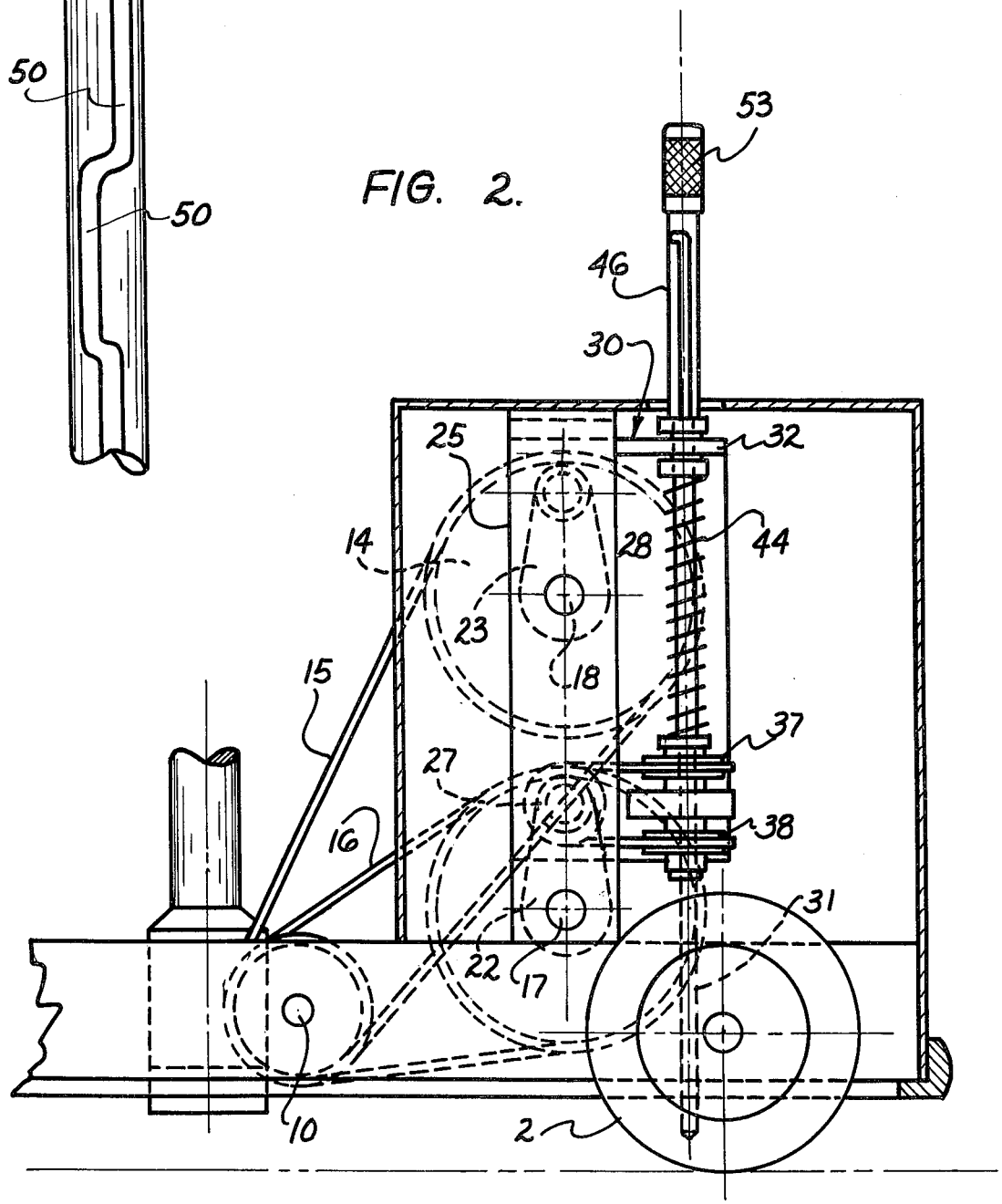
Figure 3:
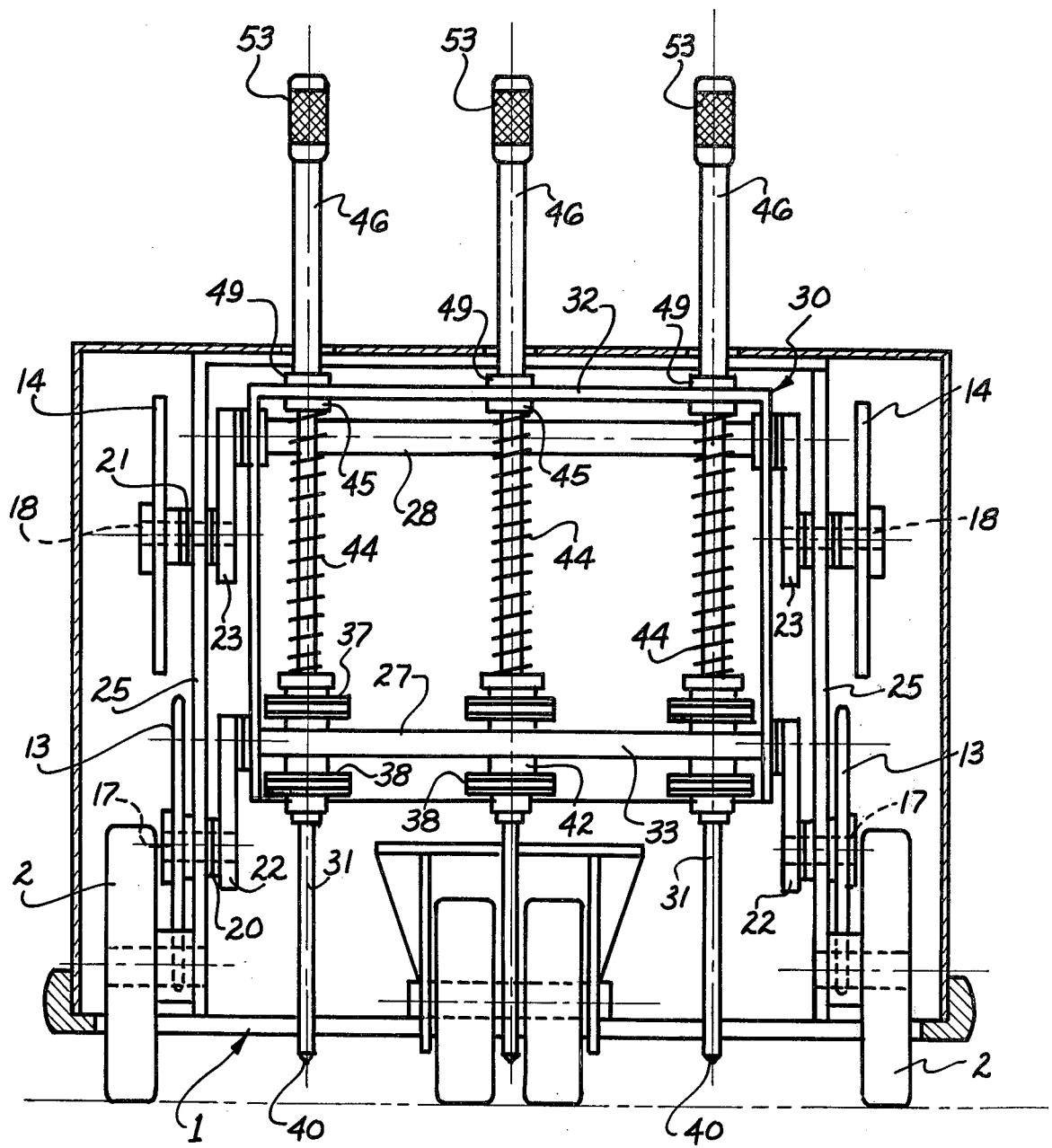
FIG. 3 is a front elevational view of the apparatus shown in FIG. 1 with the cover portion shown removed from the front of the apparatus.

Referring specifically now to FIGS. 2, 3 and 5, sprocket shafts 17 and 18 are fixed to arms 22 and 23 by pins or set screws such as at 26 such that each arm is caused to rotate as driven by sprockets 13 and 14.

The upper portions of each of arms 22 and 23 are fixed to shafts 27 and 28 respectively by pins such as 29. Shafts 27 and 28 are rotatably mounted through a rectangular shaped tine support platform 30 by means of flanged bearings such as at 58.

The forward portion of tine support platform 30 carries a plurality of aerating tines 31. Each tine extends downwardly through the upper bar 32 of platform 30 and through the lower bar 33 to a point just above ground level.

In this manner, upon rotating of sprockets 13 and 14 and shafts 17 and 18, the parallel linkage of arms 22 and 23 cause the whole platform 30 to move forwardly and downwardly and carry tines 31 in like manner to contact the ground surface.

Figure 4:
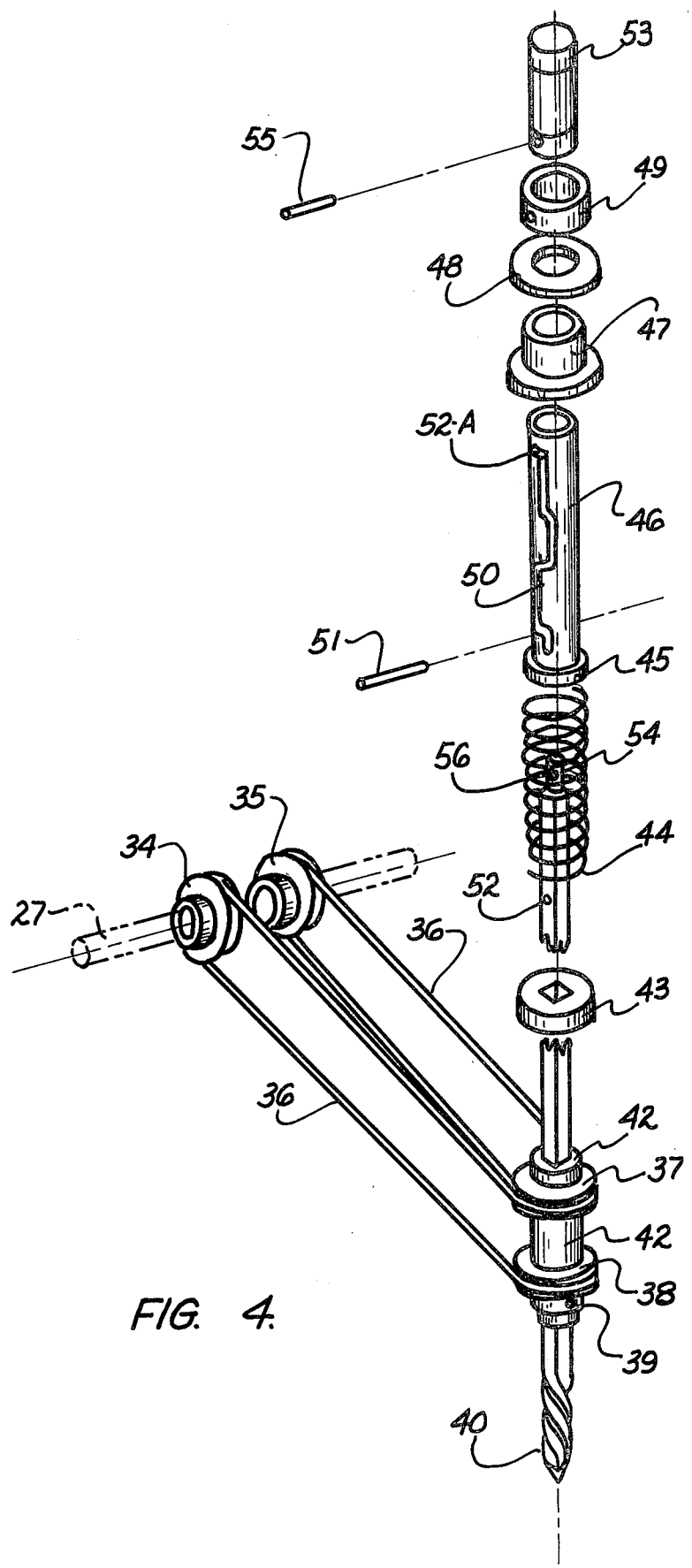
FIG. 4 is an exploded perspective view showing the tine assembly forming a portion of the apparatus shown in FIG. 1.

Additionally, it should be noted that shafts 27 and 28 are also caused to rotate within bearings 58. Shaft 27 carries a plurality of pulleys such as shown in FIG. 4. A driven pulley 34 and an idler pulley 35 are conventionally mounted on shaft 27, one such pair for each tine 31, and are operatively connected via belts 36 to a pair of pulleys 37 and 38 mounted on the lower portion of each tine 31. The lower portion of each tine 31 has a square or other non-round configuration and is mounted through a similarly shaped hole in a sleeve-like collar 42 fixed by appropriate set screws 39 to provide for a driving connection between these pulleys and each tine.

Therefore, driven sprockets 13 and 14 provide for both the parallel horizontal and vertical motion of platform 30 and for rotation of tines 31.

The lower terminal end of each tine 31 is provided with a drill tip portion 40 so that upon rotation as described above, each tine more easily may penetrate the turf to provide the bored holes necessary for aeration.

Referring specifically to FIG. 4, an exploded view of the construction of tines 31 and the relationship of the pulley drive is shown. Each tine 31 comprises an assembly including the drill tip portion 40 which is fashioned from a square or hexagonal rod, for example, carrying pulleys 37 and 38 as previously mentioned herein.

Sleeve-like bearing collar 42 is rotatably extended into a suitable hole in plate 33 through an appropriate bushing and includes an inner configuration matching the outer configuration of tine 31 to permit tine 31 to slide vertically therein but also provides a rotational driving connection between sleeve 42 and tine 31.

Pulley 38 is fixed to sleeve 42 by a suitable set screw 39 or the like, such that upon rotation of pulley 38, sleeve 42 rotates and also causes tine 31 to rotate.

Pulley 37 is suitably rotatably mounted on sleeve 42 and disposed immediately above plate 33 and is held in position by a stop collar 43. Collar 43 is fixed to tine 31 via a pin or the like, not shown and maintains the vertical positioning between pulleys 37 and 38 and sleeve 42.

A compression spring 44 is next mounted in surrounding relationship to tine 31 and extends from spring stop collar 43 upwardly to a flange 45 provided on a guide tube 46.

Guide tube 46 extends upwardly through an appropriate hole in upper plate 32 of platform 30 through a flanged bearing 47 and a thrust bearing 48 and receives a guide tube collar 49, which rests above plate 32, and is fixed to collar 49 via a set screw or the like.

Guide tube 46 includes an elongated slot 50 which terminates in an offset portion 52A.

A pin such as 51, is extended through slot 50 and through a bore 52 provided in the upper portion of tine 31.

A handle portion 53 provided with an opening adapted to receive the smaller terminal end 54 of tine 31 is fixed to terminal end 54 via pin 55 extending through hole 56. This permits the user to manually raise each tine 31 and rotate the tine to insert pin 51 in offset 52A of slot 50 when the apparatus is non-operational.

Further, a plurality of offset portions similar to 52A may be provided in slot 52 as seen in FIG. 2-A. The user then may manually raise each tine 31 and rotate the tine to insert pin 51 into any one of the vertically spaced offset portions to control the depth of penetration of tines 31 during operation. The length of each offset portion of slot 50 permits the tine to retract against the force of spring 44 if a hard object is encountered by the tine in the manner subsequently described herein.

From the foregoing description it should be understood that each tine 31 is mounted in a manner which permits rotational movement as provided by the pulley arrangement 34, 35 and 37, 38 combined with the non-round configuration of tines 31 and collar 42 providing the rotational driving connection. Also the tines are mounted for vertical sliding movement against the force of compression spring 44 via the sliding engagement as provided by the non-round configuration described above which provides for the rotational driving connection.

In this unique manner, it should readily be understood that as a tine 31 constructed as described is moved downwardly as carried by platform 30, it will penetrate the turf unless a surface is contracted which is hard enough to compress spring 44. In that event, each tine independent of the other, will be permitted to retract to prevent breakage or the like.

This force can be readily adjusted to any appropriate value by the choice of springs 44.

It should also be pointed out that this unique construction provides for the rotating drilling action of each tine to be provided from the same source of power as that which drives the movement of platform 30 via the parallel linkage arrangement providing the described movement of platform 30 which moves the tines forwardly and downwardly into contact with the turf. As the tines penetrate the turf, the whole apparatus tends to be drawn forwardly a distance approximately equal to the forward reach of the tines 31 which is dictated by the distance between the shafts 18 and 28 and 17 and 27.

In this manner, the action of the tines tends to provide a "walking" function which substantially minimizes any manual effort required to operate the apparatus.

In operation, the user must manually push the apparatus to the area which is to be aerated. Upon starting the engine, platform 30 is initiated to move in the manner described herein to drive tines 31 forwardly and downwardly into the turf. The drilling action of each tine greatly aids the ease of penetration into the turf to provide efficient aeration. As the tines penetrate the turf, the continued powered motion of arms 22 and 23 imparts a forward force to the main frame which tends to pull the apparatus forwardly.

The speed at which this motion is accomplished is, of course, governed by the power and gearing provided in the engine 5.

In view of the foregoing description, it should be readily appreciated that the present invention provides a novel aerating apparatus of relatively low cost manufacture and efficient functional purpose.

What is claimed is:

1. An apparatus for aerating turf and the like comprising in combination, a wheel supported main frame; power means mounted on said main frame and including a drive shaft driven by said power means; a plurality of driven shaft means rotatably mounted on each side of said main frame; a rigid tine support platform provided with at least two parallel vertically spaced and rotatably mounted shaft means; a plurality of vertically disposed tines rotatably mounted on said platform; a pair of crank arms disposed on each side of said platform, each of said arms being fixed at one end to opposing ends of a respective one of said shaft means mounted on said tine support platform and fixed at their opposite end to a respective one of said driven shaft means rotatably mounted to said main frame; means connecting each of said driven shaft means to said drive shaft for rotating said crank arms responsive to rotation of said drive shaft to cause said platform to move in a defined horizontal and vertical direction; first pulley means mounted on one of said shaft means mounted on said tine support platform; and second pulley means mounted on each of said tines and operatively connected to said first pulley means to cause rotation of said tines responsive to rotation of said shaft means mounted on said support platform; whereby said tines are caused to move horizontally and vertically and simultaneously rotate upon actuation of said drive shaft of said power means.

2. The apparatus defined in claim 1 wherein each of said times are slideably mounted to said support platform for independent vertical movement and are biased downwardly to resist a predetermined upward pressure on each tine.

* * * * *